(12) United States Patent
Delforge

(10) Patent No.: US 12,216,039 B2
(45) Date of Patent: Feb. 4, 2025

(54) DRIFT TUBE FIELD DRIVING SYSTEM AND METHOD

(71) Applicant: Viken Detection Corporation, Burlington, MA (US)

(72) Inventor: Adrian Delforge, Rockport, MA (US)

(73) Assignee: Viken Detection Corporation, Burlington, MA (US)

( * ) Notice: Subject to any disclaimer, the term of this patent is extended or adjusted under 35 U.S.C. 154(b) by 114 days.

(21) Appl. No.: 17/650,753

(22) Filed: Feb. 11, 2022

(65) Prior Publication Data

US 2022/0252499 A1    Aug. 11, 2022

Related U.S. Application Data

(60) Provisional application No. 63/148,432, filed on Feb. 11, 2021.

(51) Int. Cl.
*G01N 15/1031*   (2024.01)
*G01N 15/10*     (2024.01)

(52) U.S. Cl.
CPC . *G01N 15/1031* (2013.01); *G01N 2015/1027* (2024.01)

(58) Field of Classification Search
CPC .................................................. G01N 15/1031
See application file for complete search history.

(56) References Cited

U.S. PATENT DOCUMENTS

| | | | |
|---|---|---|---|
| 5,200,614 A | 4/1993 | Jenkins | |
| 6,765,198 B2 * | 7/2004 | Jenkins | G01N 27/622 250/382 |
| 7,528,367 B2 | 5/2009 | Haigh | |
| 9,147,565 B1 | 9/2015 | Goedecke | |
| 9,170,232 B2 | 10/2015 | Nacson et al. | |
| 9,709,530 B2 | 7/2017 | Zaleski et al. | |
| 2012/0153140 A1 * | 6/2012 | Makarov | G01N 27/623 250/281 |

(Continued)

FOREIGN PATENT DOCUMENTS

| | | |
|---|---|---|
| EP | 3379562 A1 | 9/2018 |
| WO | 2022/174258 A1 | 8/2022 |

OTHER PUBLICATIONS

International Search Report and Written Opinion of PCT/US2022/070633 dated May 17, 2022.

(Continued)

*Primary Examiner* — Reena Aurora
(74) *Attorney, Agent, or Firm* — Sunstein LLP

(57) ABSTRACT

An apparatus for generating high voltage (HV) driving signals associated with an ion mobility detector comprises a ground-based HV base module and a HV deck module coupled by an interconnect module. The HV base module implements dual power supplies that together drive a drift tube voltage signal to the high-voltage-based deck module. Each of the power supplies is regulated by a combination open loop and closed loop controller. The HV deck module implements one or more grid modules that generate a bipolar voltage that floats on the drift tube voltage signal. Also included may be a pulse generator configured to generate at least one synchronizing timing pulse. Power supplies within the apparatus may be synchronized based on the synchronization timing pulse.

23 Claims, 8 Drawing Sheets

(56) References Cited

U.S. PATENT DOCUMENTS

2014/0117222 A1    5/2014  Nguyen
2019/0236295 A1   11/2019  Zimmermann et al.
2019/0369049 A1   12/2019  Ridgeway
2020/0258734 A1*  8/2020  Denis .................... H01J 49/282

OTHER PUBLICATIONS

Snuder, D.T., et al., "Minature and Fieldable Mass Spectrometers: Recent Advances", Analytical Chemistry, vol. 88, No. 1, Sep. 30, 2015.

* cited by examiner

DRIFT TUBE FIELD DRIVING SYSTEM AND METHOD

RELATED APPLICATION

This application claims the benefit of U.S. Provisional Application No. 63/148,432, filed on Feb. 11, 2021. The entire teachings of the above application are incorporated herein by reference.

BACKGROUND

An ion mobility detector measures the amount of time it takes for an ion to traverse a known length within a uniform electric field, and makes determinations about characteristics of the ion based on the measured time. By selectively applying voltages to certain gating grids located at or near the entrance of the drift tube, the timing of specimen ions introduced into the drift tube may be precisely controlled. Precisely controlling when the ion enters the drift tube allows the "time of flight" through the drift tube to be accurately measured. The time of flight of the ion through a known, uniform electric field may be used to determine the composition of the ion.

FIG. 1 illustrates components of an example implementation of an ion mobility detector 100. The components and parameters described below for this implementation are examples only for the purposes of this description. It should be understood that other components and/or parameters may be used. The detector 100 may comprise a sample inlet 101, an ionization region 102, an ion gate grid 103, a drift tube grid 104, a drift tube 105, an aperture grid 106, and a Faraday ion collector 107.

A chemical to be analyzed is placed into the sample inlet 101. In the ionization region 102, an ion source is used to ionize neutral molecules of the chemical. The ionized molecules are then injected into the drift tube 105.

A voltage applied across the drift tube grid 104 and the aperture grid 106 produces a uniform electric field within the drift tube 105. The polarity of this voltage is periodically reversed so that the resulting electric field alternates polarity to accommodate both positive and negative ions.

The voltage at the ion gate grid 103 is manipulated with respect to the voltages at the ionization region 102 and the drift tube grid 104 to provide an ion gating function, e.g., to either (i) prevent ions from propagating from the ionization region 102 towards the drift tube 105, (ii) allow ions to propagate from the ionization region 102 to the drift tube 105, or (iii) to push ions towards the drift tube 105 once the ions have exited the ionization region 102. The voltages applied to the ionization region 102 and the ion gate grid 103 need to change polarity along with the voltage across the drift tube to properly provide the ion gating function at either end of the polarity range.

The drift tube field (i.e., field from entry to exit of the drift tube 105) of the example implementation described above may be on the order of 400 to 500 volts/cm. This example field strength would require a voltage across the drift tube 105 (i.e., from the drift tube grid 104 to the aperture grid 106) of about 5000V for a 10 cm drift tube. Because the drift tube field alternates to accommodate both positive and negative ions, the voltage across the drift tube needs to alternate between +5000V and −5000V. This alternating may occur with a period of about 20 mS. The timing of the drift tube voltage and of the ion gate grid voltage should be accurate and repeatable.

Uncertainty in the timing of these voltages affects the ion time of flight measurements and consequentially the determination of the ion composition.

SUMMARY

The embodiments of the invention described herein are directed to an ion mobility detector method and system, a method and apparatus for generating high voltage driving signals associated with an ion mobility detector, and physical architectures associated with the ion mobility detector and the apparatus for generating high voltage driving signals.

The example embodiments of the invention described herein may include a drift tube that supports a uniform electric field (E), as shown in FIG. 1. The E field may be generated by a voltage applied across the drift tube, i.e., a voltage (referred to herein as the "drift tube voltage") applied to the drift tube grid 104 with respect to the aperture grid 106. The polarity of the drift tube voltage may be periodically reversed so that the resulting E field alternates polarity to facilitate evaluation of both positive and negative ions. One embodiment may be directed to facilitating controlled, gradual rise and fall times of the drift tube voltage. An embodiment may be directed to the use of a photodiode to apply the voltage to the drift tube grid 104. An embodiment may be directed to a polarity controller that performs the positive and negative high voltage switching and control of the photodiodes.

The ion mobility detector system of the described embodiments may operate cyclically, with an acquisition component and a transition component. Each cycle may include two transition components and two acquisition components. During the first transition period the drift tube voltage transitions from an initial polarity (e.g., positive) to the opposite polarity (e.g., negative), and during the second transition period the drift tube voltage transitions back to the initial polarity. The desired field strength of the drift tube E field is on the order of 400 to 500 volts per centimeter, so the drift tube voltage is necessarily in the thousands of volts. In the example embodiments described herein, the drift tube voltage is approximately 5,000 volts.

An embodiment of the invention may be directed to selectively close the loop for voltage regulation of the positive and negative voltage sources used to drive the drift tube grid during transition (i.e., while the drift tube grid voltage switches polarities), and open loop regulation (i.e., no regulation) during acquisition time at each of the voltage polarity extremes. As used herein, "acquisition time" refers to the time from when an ion sample enters the drift tube until the ion sample is detected at the ion collector 107. A proportional-integral-derivative (PID) controller may be used to regulate the drift tube grid voltage during the closed-loop voltage regulation time, to compensate for drift due to temperature, etc. During data acquisition, high voltage source outputs are locked (i.e., open loop, no regulation). The E field on the drift tube needs to be constant and stable during acquisition times, because field variations will affect the time-of-flight measurements and perturbations of ion current measurements. Locking the high voltage outputs during acquisition ensures that the regulation control loop will not change the drift tube voltage (and consequently the E field on the drift tube) during the acquisition portions of the polarity cycle.

Because the high voltage outputs are locked during acquisition time, the only variation on the drift tube voltage is the switching noise (i.e., the ripple generated by the high voltage switching supplies). An embodiment of the invention may incorporate multistage filters at the output of the high voltage sources to substantially reduce switching noise. The sampling of the data acquisition system may be synchronized to the high voltage source switching frequency so that sampling consistently occurs at the same point of the switching ripple period (e.g., peak, trough), thereby eliminating the effect of high voltage (HV) switching noise. Additionally, due to associated high impedances, the synchronization of all switching activity may be provided to further reduce noise contributions to ion current measurements.

An embodiment of the invention may arrange components to include a base module and a high voltage deck that is isolated from the base module by intermediate isolation components. The intermediate isolation components may reside on one or more interconnect modules. The intermediate isolation components may include, for example, photodiodes, opto-isolators, and/or other such devices known in the art for isolating circuitry regions operating at voltage potentials that are substantially different. The base module may include a processor that is configured to generate system timing signals, and pulse-width modulation (PWM or pwm) signals for driving inverters (e.g., switching power supplies). A first inverter may produce a cyclic voltage signal of a first polarity (e.g., positive), and a second inverter may produce a cyclic voltage signal of a second polarity opposite of the first polarity (e.g., negative). The base module may also produce control signals that are used by the isolation components to combine the first polarity voltage signal with the second polarity voltage signal in a coordinated manner. The high voltage deck may include one or more grid modules for generating voltages to be applied to a control grid in the drift tube that are crafted to control gating of ions in the drift tube.

An embodiment of the invention may be implemented by a folded mechanical architecture comprising a HV base module and a HV deck module, which are coupled through an interconnect module that utilizes the required spacing between the base and deck to provide for high speed optical signal components and polarity switching circuitry. The HV base module and the HV deck module are spaced apart to provide isolation between the HV base module and the HV deck module.

In one aspect, the invention may be an ion mobility detector system, comprising an ion mobility detector hardware subsystem comprising a drift tube and one or more control grids, and a drift tube voltage driving subsystem. The drift tube voltage driving subsystem may comprise a HV base module, referenced to a ground potential, having a first power supply configured to generate a first high-voltage output and a second power supply configured to generate second high-voltage output of a different polarity with respect to the first high-voltage output. The drift tube voltage driving subsystem may further comprise an interconnect module configured to electrically and physically couple the HV base module to a HV deck module. The interconnect module may comprise a first switch assembly to selectively couple the first high-voltage output to a node, and a second switch assembly to selectively couple the second high-voltage output to the node. The HV deck module may be configured (i) to receive the node voltage, (ii) to generate at least one gating signal referenced to the node voltage, and (iii) to convey the node voltage and the at least one gating signal to the ion mobility detector hardware subsystem.

The drift tube voltage driving subsystem may cause the node voltage to be a cyclic voltage that has (a) a first transition interval, (b) a first acquisition interval, (c) a second transition interval, and (d) a second acquisition interval. Each one of the first power supply and the second power supply may be regulated in a closed loop by a proportional-integral-derivative (PID) controller during the first and second transition intervals, and may be unregulated in an open loop and is locked at a fixed voltage during the first and second acquisition intervals.

The ion mobility detector system may further include a pulse generator configured to generate at least one synchronizing timing pulse. At least the first power supply, the second power supply, the first switch assembly, the second switch assembly, and the HV deck module may be synchronized based on the synchronization timing pulse. Each of the first and second power supplies may comprise a digital PID controller configured to produce a pulse-width modulated waveform based on feedback from the respective output of the respective power supply, a switching inverter configured to generate a high voltage signal based on the PWM signal, and a multistage filter configured to attenuate switching noise on the high voltage signal.

The first switch assembly and the second switch assembly may each comprise a photodiode, a light source to selectively illuminate the photodiode, and a shielding block configured to house the photodiode and light source and block external light therefrom. The first switch assembly and the second switch assembly may be arranged between the HV base module and the HV deck module as spacers to provide physical separation therebetween. The first photodiode and the second photodiode may each be selectively illuminated to control a transition rate of the first polarity voltage and a transition rate of the second polarity voltage. Selective illumination of the first photodiode and the second photodiode may be controlled by a digital signal processor (DSP). The HV base module may host the DSP.

The node voltage may be electrically coupled to the drift tube, and the at least one gating signal may be electrically coupled to an ion gate grid. The ion mobility detector hardware subsystem may further comprise a data acquisition system configured to detect ions that have completed propagation through the drift tube. Sampling events of the data acquisition system may be synchronized with a switching frequency associated with the first high-voltage output and the second high-voltage output, such that the sampling events occur at a consistent point in time with respect to a switching waveform associated with the first high-voltage output and the second high-voltage output.

In another aspect, the invention may be a method of driving a drift tube voltage of an ion mobility subsystem, comprising generating, by a first power supply, a first polarity voltage, and generating, by a second power supply, a second polarity voltage. Each of the first power supply and the second power supply may comprise a proportional-integral-derivative (PID) controller. The method may further comprise using a first photodiode-based switch to selectively apply the first polarity voltage to a node. The method may further comprise using a second photodiode-based switch to selectively apply the second polarity voltage to the node. The method may further comprise electrically coupling the node to the drift tube.

The method may further comprise applying the first and second voltages to the node to produce a cyclic voltage at the node is characterized by (a) a first transition interval, (b) a first acquisition interval, (c) a second transition interval, and (d) a second acquisition interval. The method may further comprise regulating each of the first power supply and the second power supply in a closed loop by the PID controller during the first and second transition intervals, and leaving each of the first power supply and the second power supply in an unregulated, open loop state that is locked at a fixed voltage during the first and second acquisition intervals.

The method may further comprise controlling the first photodiode-based switch and the second photodiode-based switch to control a transition rate of the first polarity voltage and a transition rate of the second polarity voltage, to regulate the diode current to compensate for temperature variation, and to regulate diode current to compensate for temperature variation.

In another aspect, the invention may be a method of driving voltage signals to a drift tube and an associated ion gate grid of an ion mobility subsystem, comprising applying a cyclic drift tube voltage to the drift tube. The cyclic drift tube voltage may have (a) a first transition interval, (b) a first acquisition interval, (c) a second transition interval, and (d) a second acquisition interval. The method may further comprise applying an ion gate voltage to the ion gate grid during at least the first acquisition interval, the ion gate voltage comprising a sum of the drift tube voltage and a time-varying control voltage. The method may further comprise generating the time-varying control voltage as a first interval at an ion gate close voltage, followed by a second interval at an ion gate open voltage, followed by a third interval at an ion gate push voltage, followed by a fourth interval at the ion gate close voltage.

The method of claim 16, wherein (i) the ion gate close voltage is greater than a voltage on a sample ionization region, thereby preventing ions from propagating from the sample ionization region to the drift tube, (ii) the ion gate open voltage is less than a voltage on a sample ionization region, thereby allowing ions to propagate from the sample ionization region to the drift tube, and (iii) the ion gate push voltage is greater than the ion gate open voltage and less than the ion gate close voltage, thereby propelling ions in a region between the ion gate grid and the drift tube into the drift tube.

The method may further comprise inserting an interval of substantially zero volts (i) between the ion gate close voltage and the ion gate open voltage, (ii) between the ion gate open voltage and the ion gate push voltage, and (iv) between the ion gate push voltage and the ion gate close voltage.

In another aspect, the invention may be a drift tube voltage driving subsystem for an ion mobility detector system, comprising a high voltage base module, a high voltage deck module arranged parallel to and spaced apart from the high voltage base module, and an interconnect module arranged perpendicular to the high voltage base module and the high voltage deck module. The interconnect module may be electrically and mechanically coupled to the high voltage base module and to the high voltage deck module.

The drift tube voltage driving subsystem may further comprise at least one spacer assembly to maintain spacing between the high voltage base module from the high voltage deck module. The at least one spacer may enclose a photodiode-based switch and thereby isolate the photodiode-based switch from external light.

In another aspect, the invention may be an ion mobility detector system, comprising an ion mobility detector hardware subsystem comprising a drift tube and one or more control grids, and a voltage driving subsystem configured to drive voltages to the drift tube and the one or more control grids. The voltage driving subsystem comprising a switching power supply having a periodic switching waveform characterized by a switching frequency. The ion mobility detector system may further comprise a data acquisition system configured to detect ions that have completed propagation through the drift tube. Sampling events of the data acquisition system may be synchronized with the switching frequency such that the sampling events occur at a consistent point in time with respect to the switching waveform.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 1:
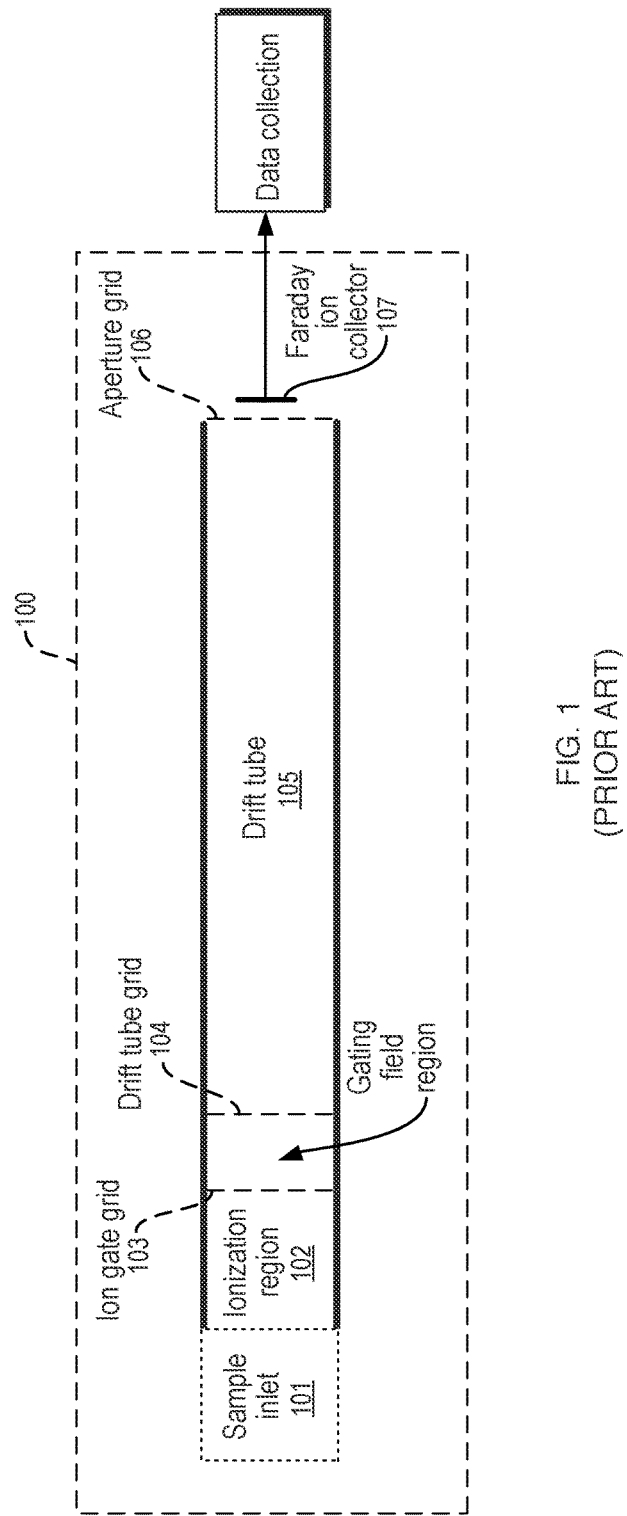
FIG. 1 shows components of an example implementation of an ion mobility detector.
Figure 2:
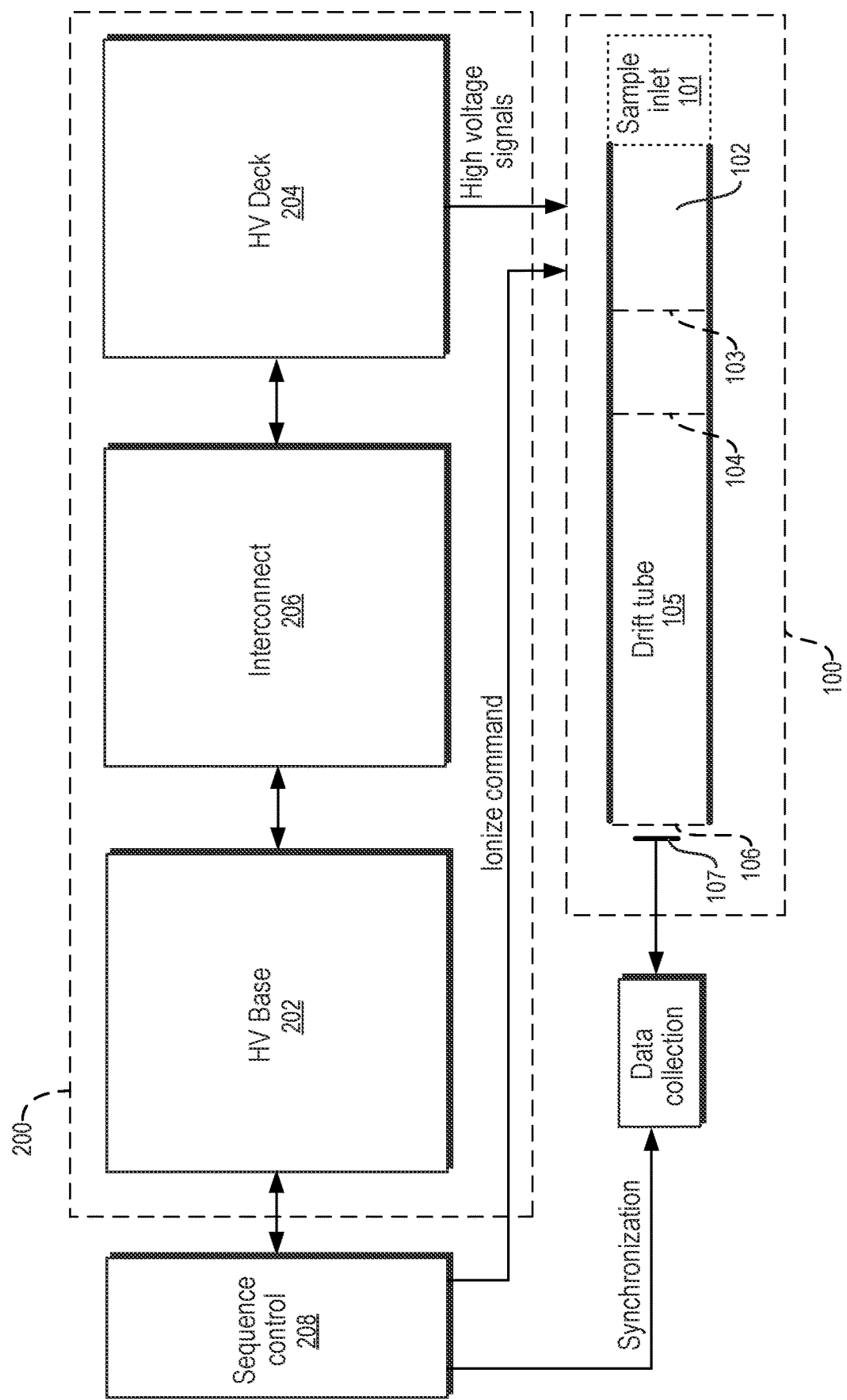
FIG. 2 illustrates an example embodiment of an ion mobility detector system according to the invention.

FIG. 2 illustrates an example embodiment of an ion mobility detector system according to the invention. The ion mobility detector system comprises a drift tube voltage driving subsystem 200 and ion mobility detector hardware subsystem 100. The drift tube voltage driving subsystem 200 comprises a high voltage (HV) base module 202, a HV deck module 204, and an interconnect module 206.

The HV base module 202 may comprise two distinct high voltage power supplies configured to generate the positive and negative polarities of the drift tube voltage. The HV base module 202 may further comprise a digital signal processor (DSP) configured to perform the regulation of each of the high voltage power supplies in conjunction with proportional-integral-derivative (PID) controllers (an individual PID control loop for each high voltage power supply) and polarity controllers, and coordinated with data acquisition, as is described in more detail below.

FIG. 2 also illustrates a HV deck module 204, which is electrically coupled to the HV base module 202 by an interconnect module 206. The HV deck module 204, which operates at the drift tube voltage (e.g., 5000V for the example embodiment), may comprise one or more grid modules. The one or more grid modules generate voltages to be applied to the ion gate grid, floating on the drift tube voltage, for control of ions entering the drift tube. In the example embodiments described herein, the HV deck module 204 implements three grid modules. The grid modules are managed by a DSP on the HV deck module 204 that performs the critical timing and control functions associated with producing the grid module output voltages. The HV deck DSP module 360 is referenced to the high voltage levels of the drift tube voltage. The architecture of the described embodiments allows a single bi-directional communication channel to the ground based controls via high speed high voltage fiber optic isolators. All non-critical control signals for grid voltage management, polarity selection, and self-diagnostics are relayed through this channel and the HV deck DSP 360, which dramatically reduces cost and size of dedicated isolated control signals. The time critical grid commands utilize one or more dedicated high speed HV fiber optic isolators, as described herein.

FIG. 2 also shows the interconnect module 206, which comprises a high voltage diode switch, implemented with a photodiode, for each of the positive and negative polarities of the drift tube voltage. The interconnect module 206 may further comprise a number of opto-isolators for conveying time-critical grid commands from the sequence controller 208 to the grid modules on the HV deck module 204, and control information between the base DSP on the HV base module 202 and the HV deck DSP 360.

Figure 3A:
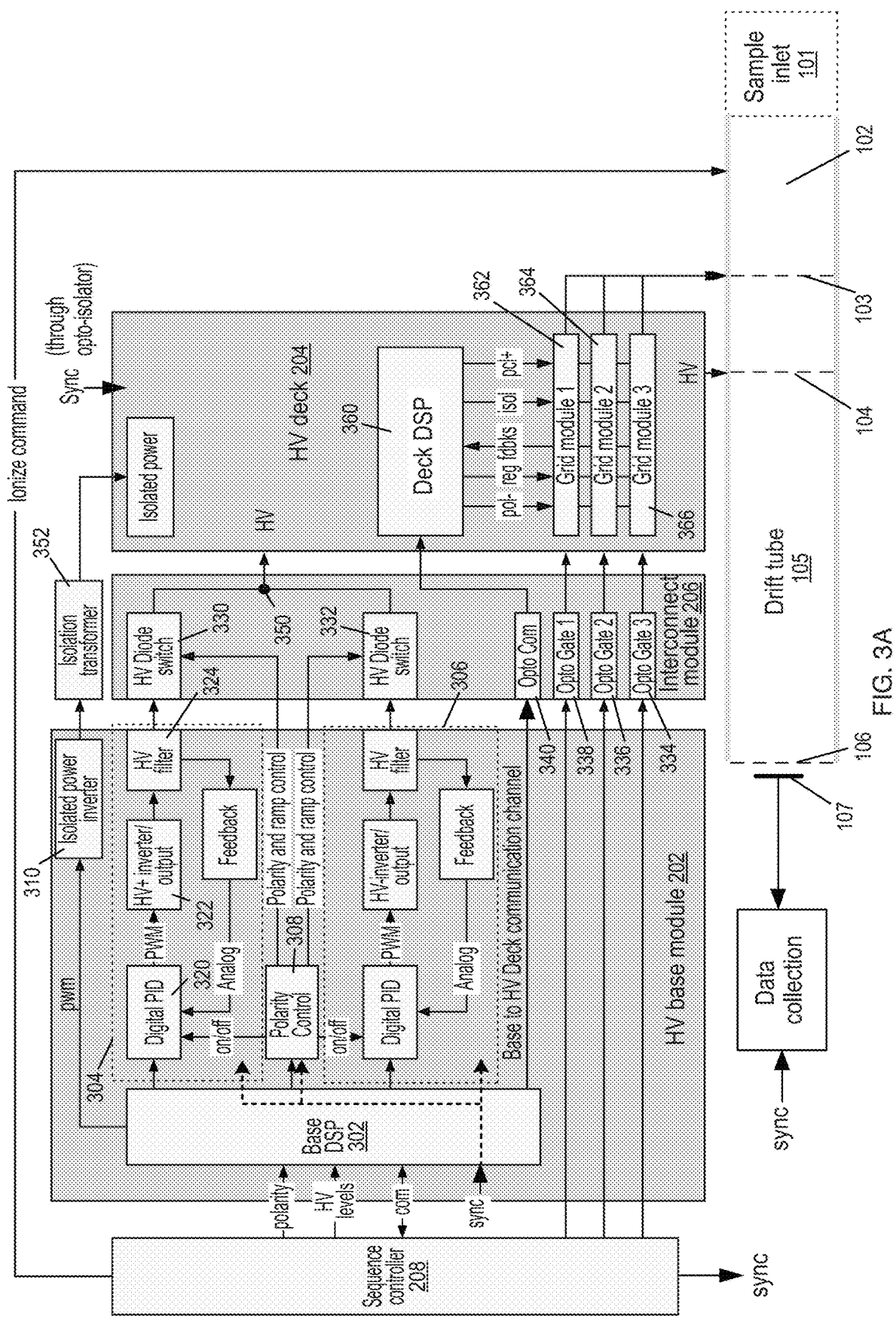
FIG. 3A illustrates a more detailed view of the components within the drift tube voltage driving system shown in FIG. 2, according to the invention.

FIG. 3A illustrates a more detailed view of the components within the example HV base module 202, the HV deck module 204, and the interconnect module 206.

The HV base module 202 comprises the base DSP 302, a first high-voltage power supply 304, a second high-voltage power supply 306, a polarity controller 308, and an isolated power inverter 310. Each of the first and second high voltage power supplies comprises a digital PID controller 320, which produces a pulse-width modulated (PWM) waveform based on feedback from the respective output of the high voltage power supply 304, 306. A switching inverter 322 generates a high voltage signal (e.g., 5,000V in the example embodiment) based on the PWM signal from the PID controller 320. A multistage filter 324 attenuates switching noise on the high voltage signal that is a by-product of the switching inverter 322.

As described herein, the high voltage source outputs are locked (i.e., open loop, no regulation) during data acquisition, to ensure that the regulation control loop will not change the drift tube voltage during the acquisition portions of the polarity cycle. High frequency switching noise, however, generated by PWM-based and other switching power sources, may remain even when the PID controllers 320 are locked. To mitigate the high frequency switching noise, example embodiments of the acquisition system may supply a synchronization timing pulse (sync) that sets the operating frequency of the DSP controlled inverter 322. The synchronization timing pulse, generated by the sequence controller 208, is used to initiate the start of data collection, and is the primary time base for the system. In general, data collection begins when a predetermined number of synchronization timing pulses have occurred. In such embodiments, all the power sources that are based on pulse-width modulation, both in the low-voltage realm (e.g., on the base module 202) and on the HV deck 204, are synchronized according to the synchronization timing pulse. The example DSP 302 may have fine control resolution of 1 nS of the inverter drive signals (although other resolution values may be used), allowing for the insertion of a known and programmable phase between the synchronization timing pulse (sync) and the transitions of the HV inverter switches 330, 332. The phase adjustment facilitates a noise-free time to sample data, which mitigates interference from switching noise from the various power sources.

The base module 202 also implements the isolated power inverter 310 to supply the control voltage for the HV deck module 204. The isolated power inverter 310 floats on the high-voltage generated at HV node 350 at the output of the HV diode switches 330, 332. The isolated power inverter 310 provides a power source for the electrical components (e.g., deck DSP 360, and grid modules 362, 364, 366) on the HV deck 204, which are operating atop the HV node 350 voltage. The digital PID 320 of both the first high-voltage power supply 304, and the second high-voltage power supply 306, utilize the synchronization timing pulse to control timing of the pulse-width modulation signals they produce. The polarity controller 308 uses the synchronization timing pulse to control timing of the polarity and ramp control signals to the high voltage diode switches 330, 332. The power inverter 310 is also synchronized based on the synchronization timing pulse. The synchronization timing pulse may be conveyed to the HV deck 204 through an opto-isolator (not shown in FIGS. 3A and 3B).

In general, the base DSP 302 generates several sets of pulse-width modulation (pwm) signals based on the sync signal. The DSP 302 implements a pwm timebase, which is synchronized to the synchronization timing pulse. One set of pwm signals is generated for the first high voltage power supply 304 (e.g., to the first digital PID 320 in 304). Another set of pwm signals is generated for the second high-voltage power supply 306 (e.g., to the second digital PID 320 in 306). Another set of pwm is generated for the isolated power converter 310. The control signals to the photodiodes (polarity and ramp control) from the base DSP 302 are also synchronized based on sync signal.

The deck DSP 360 and the grid modules 362, 364, 366 cooperate to generate a grid voltage that floats on the high-voltage power supply output and is applied to the ion gate grid 103. The DSP 360 and the grid modules 362, 364, 366 utilize the synchronization timing pulse to control timing of the voltage regulation on the HV deck 204, consistent with the other voltage sources on the HV base module and other lower voltage portions of the system.

The interconnect module 206 of this example embodiment comprises a first diode switch 330 for the first high-voltage power supply 304 and a second diode switch 332 for the second high-voltage power supply 306. In one embodiment, each diode switch (330, 332) comprises a photodiode in close proximity to a light source such as one or more light emitting diodes (LEDs). A photodiode blocks current when reverse-biased (as for an ordinary diode), but only allows current to flow in the forward direction if the photodiode is illuminated by a light source. The amount of current that the photodiode allows to pass through it is proportional to the intensity of the incident light. In the example embodiment described herein, the photodiode and two associated LEDs are enclosed in shielding blocks that also serve as separators between the HV base module 202 and the HV deck module 204. The separator blocks isolate the photodiode from external light, so that the only incident light is from the LEDs. The photodiode, LEDs, and shielding block are herein referred to as a HV diode switch. The two associated LEDs are configured with one LED on either side of the photodiode to facilitate uniform illumination. Each of the first and second (i.e., positive and negative) high-voltage power supply outputs is connected to a separate HV diode switch, and the outputs of the HV diode switches are electrically coupled at HV node 350, which is electrically coupled to the HV deck 204. To remove both the positive and negative high voltage outputs from HV node 350, both HV diode switches are disabled by shutting off the current to their respective LEDs.

Figure 4:
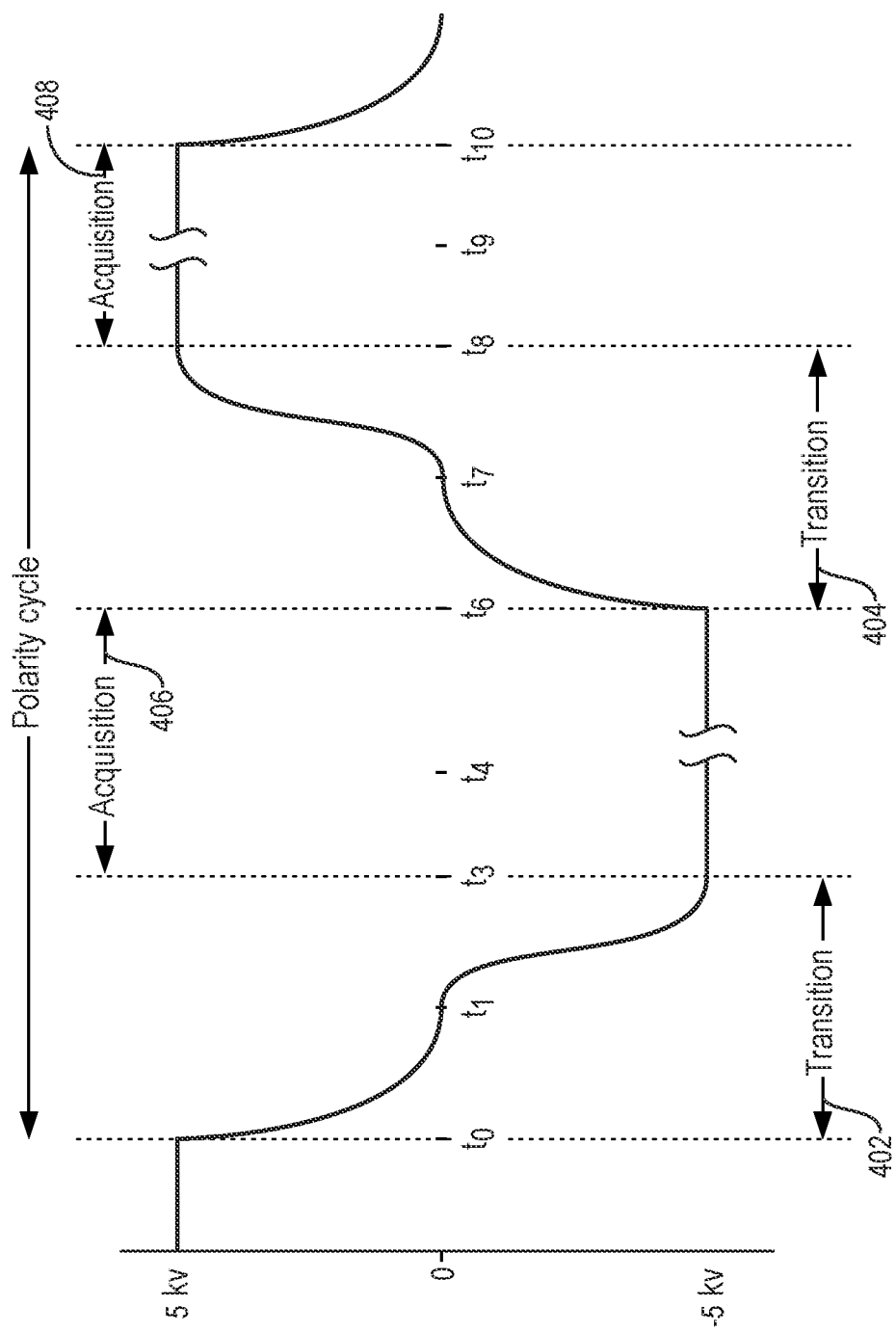
FIG. 4 illustrates the polarity cycle of the drift tube grid voltage to facilitate the E field polarity changes necessary to accommodate positive and negative ion samples.
Figure 5:
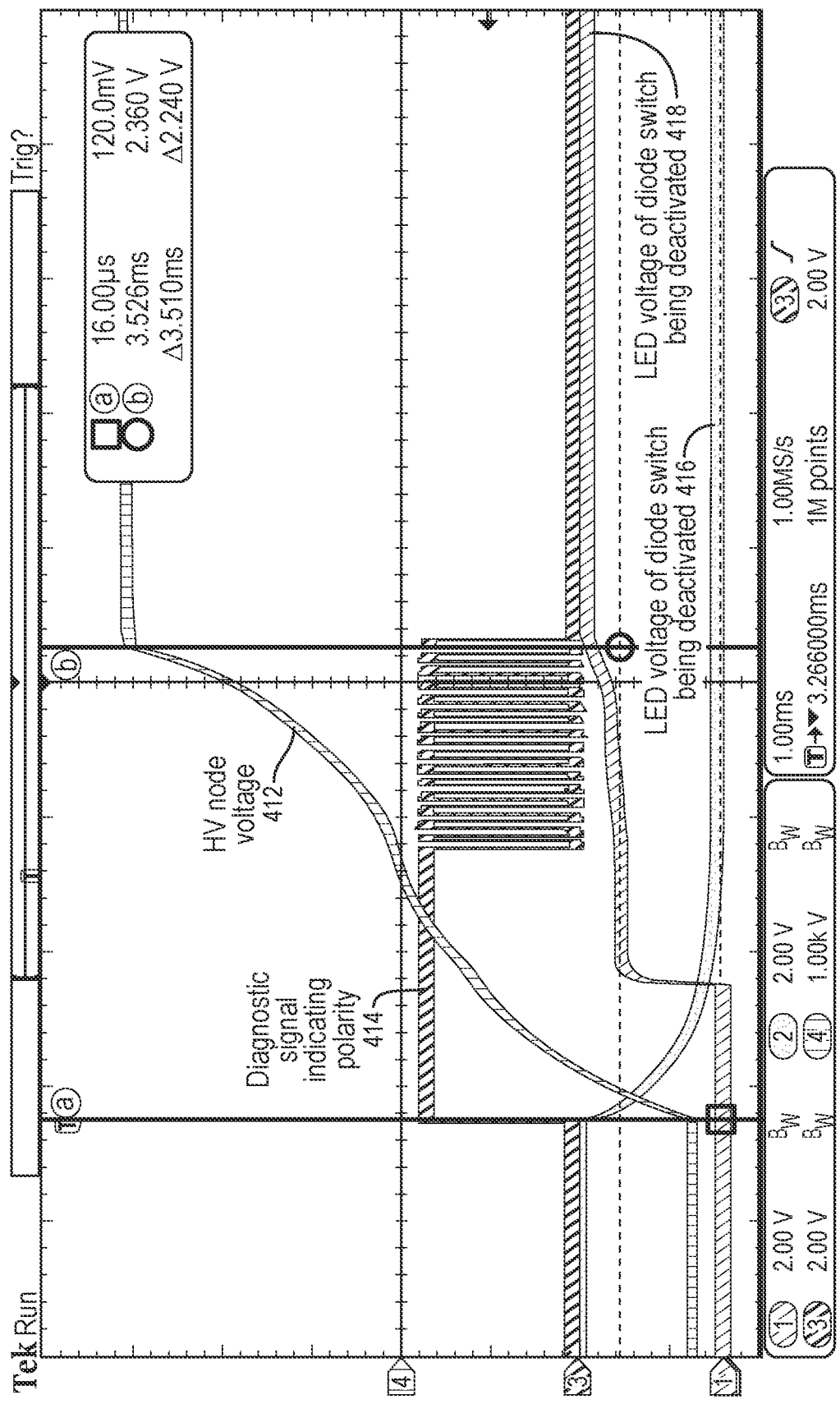
FIG. 5 illustrates a transition of the voltage at HV node from a negative extreme to a positive extreme, along with the photodiode control and regulation.

The base DSP 302 coordinates the operation of the positive and HV diode switches to switch polarity at HV node 350. FIG. 4 illustrates the polarity cycle of the drift tube grid voltage to facilitate the E field polarity changes necessary to accommodate positive and negative ion samples. Each polarity cycle comprises two transition periods 402, 404, and two acquisition periods 406, 408. During the acquisition periods, the drift tube grid voltage remains constant and stable so as not to introduce error into the ion time-of-flight measurement. FIG. 5 illustrates a transition of the voltage 412 at HV node 350 from its negative extreme to its positive extreme. To begin a transition, a polarity signal 414 changes state, and the current to the photodiode that is currently active (i.e., the photodiode associated with the negative high voltage power supply) is disabled by gradually decreasing the voltage 416 to its associated LEDs. This allows the stored charge in the cables and semiconductors to discharge, which reduces the electromagnetic interference (EMI) and the current impulse into the acquisition system by reducing the voltage change with respect to time (i.e., dv/dt). A large dv/dt can inject a substantial amount of noise into the system (e.g., 5 kV/1 μsec vs 5 kV/2 msec).

As the voltage on the output of the active (i.e., negative) HV power supply drops part way, the voltage 418 on the LEDs of the inactive HV diode switch is raised to just below the LEDs' threshold, so that no current yet flows. Once the voltage 416 falls to near zero volts, the voltage 418 of LEDs in the now active HV diode switch is increased, which in turn increases the current in the associated LEDs and allows more current to flow from the now active (i.e., positive) power supply to the HV node 350. Similar operation occurs for the transition from the positive extreme to the negative extreme.

The interconnect module 206 further comprises opto-isolators 334, 336, and 338 that convey time-critical commands from the sequence controller 208 to the grid modules 362, 364, 366 on the HV deck module 204, while providing voltage isolation between the ground-based HV base module 202 and the high voltage HV deck module 204. Opto-isolator 340 conveys information between the base DSP 302 and the deck DSP on the HV deck module 204.

Figure 3B:
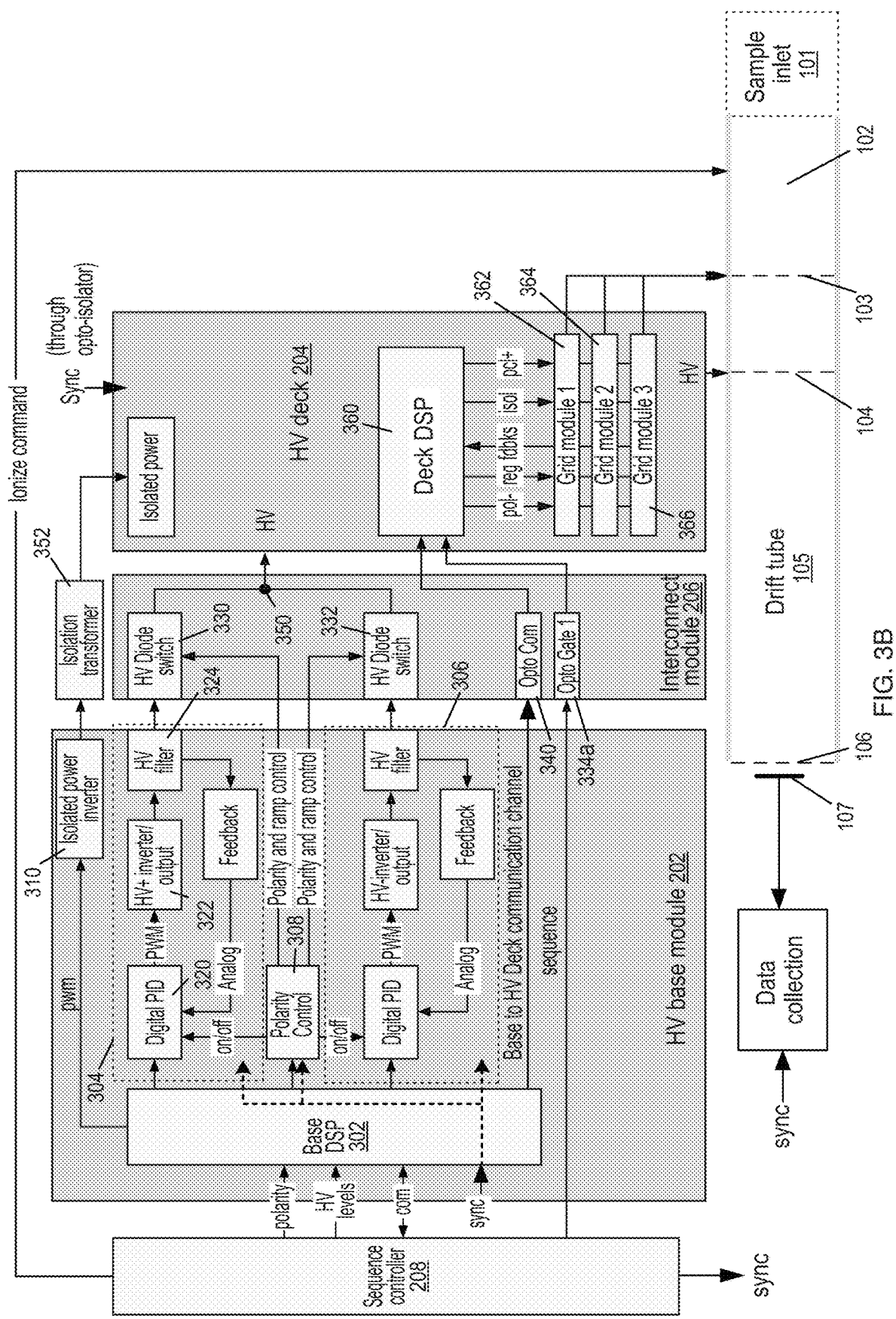
FIG. 3B an alternative embodiment of the components shown in FIG. 3A.

FIG. 3B illustrates an alternative for conveying time critical signals from the sequence controller 208 to the high voltage deck 204. In this alternative example embodiment, rather than sending an individual timing signals from the sequence controller 208 through separate opto-isolators 334, 336, 338 to the three grid modules 362, 364, 366, as depicted in FIG. 3A, the sequence controller 208 generates a single timing signal "sequence," which triggers timing sequencing in the deck DSP 360 to generate the individual timing signals for the grid modules 362, 364, 366. The single critical timing signal "sequence" requires only on opto-isolator 334a.

The HV deck module 204 comprises a deck DSP 360, and three grid modules 362, 364, 366. Although the example embodiment utilizes three grid modules, it should be understood that, in general, more than three or less than three grid modules may be used. The HV deck module 204 receives the high-voltage power supply output from node 350 on the interconnect module 206 and conveys the high-voltage power supply output to the drift tube grid 104. The deck DSP 360 and the grid modules 362, 364, 366 cooperate to generate a grid voltage that floats on the high-voltage power supply output and is applied to the ion gate grid 103. Each grid module generates a bipolar grid voltage, and either polarity may be selectively applied to the drift tube grid 104 within 50 nS from a ground based acquisition controller that measures ion current generated locally for the HV deck DSP 360 utilizing a system clock.

In the example embodiment, each independent grid voltage that is generated on a grid module (362, 364, 366) is variable from zero to 800V to provide matched voltage levels of up to +/−800V. Each independent grid voltage may be generated on a center-tapped transformer to provide the matched voltage levels, using a self-resonant inverter that provides a high-voltage (e.g., +/−800V) sine wave drive free of high frequency harmonics (unlike traditional digital pulse-width modulation schemes). The self-resonant inverter facilitates low electro-magnetic interference and maintains an electrically quiet environment for data acquisition.

Each of the bipolar grid supply voltages, generated on a grid module (362, 364, 366), is provided to an independent bidirectional switch. The bidirectional switches are driven by circuits that have integral cross conduction prevention, and provide on-demand drive of the constituent MOSFETS within 25 nS latency from a ground based signal. The grid modules 362, 364, 366 can be configured to drive separate electrodes or be tied to a common electrode (as in the example embodiment of driving the ion gate grid 103) for independent voltage states at either polarity with at least 50 nsec response time.

All critical timing and control resources for the grid modules reside within the high-voltage referenced DSP 360 on the HV deck module 204. This arrangement facilitates a single bi-directional communication channel for the ground-based controls from the base DSP 302 through a high speed HV fiber optic isolator 340. All non-critical control signals for grid voltage management, polarity selection, and self-diagnostics are relayed through this channel to the DSP, dramatically reducing cost and size as compared to dedicated isolated control signals. The time critical grid commands from the sequence controller 208 are conveyed using dedicated high speed HV fiber optic isolators (334, 336, 338), although as disclosed herein, the time critical grid commands may be generated by the DSP 360 on the HV deck module 204, triggered by a single time-critical "sequence" signal (see, e.g., FIG. 3B).

Power for the HV deck module 204 is provided through a single HV transformer 352, capable of at least 10,000V isolation, driven from the HV base module 202. From this single supply the HV deck module 204 provides the common control voltages for all grid modules 362, 364, 366.

Figure 6A:
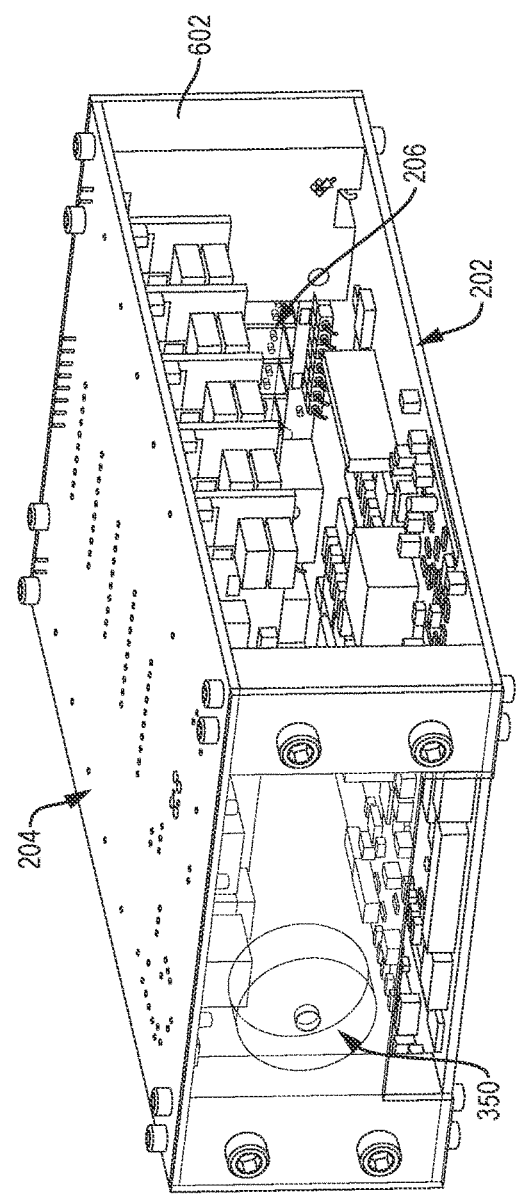
FIGS. 6A and 6B illustrate the folded architecture of the HV base module and the HV deck module coupled by the interconnect module.
Figure 6B:
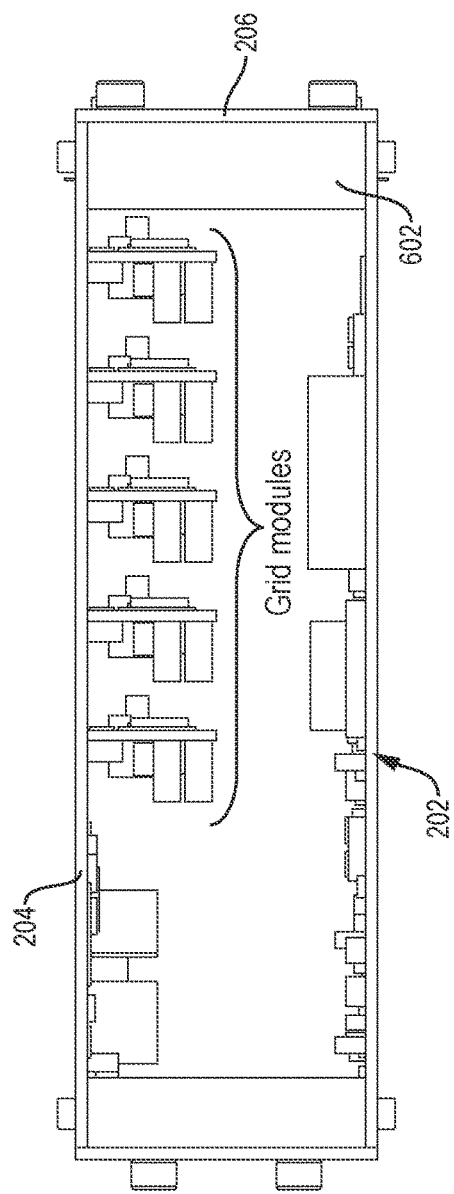

Embodiments of the drift tube voltage driving subsystem 200 may incorporate a folded physical architecture, as depicted in FIGS. 6A and 6B. The folded architecture includes the HV base module 202 arranged parallel to the HV deck module 204, with the interconnect module 206 arranged perpendicular to both the HV base module 202 and the HV deck module 204. The physical space between the HV base module 202 and the HV deck module 204, which is required for voltage isolation between the modules, is utilized to locate the HV optical isolators 334, 336, 338, and the isolation transformer 352. The support elements 602 may be used to enclose the photodiodes of the HV diode switches to preventing ambient light from leaking to the photodiodes and compromising operation.

As shown in FIG. 6B, the grid cards 362, 364, 366 may be oriented perpendicular to the HV deck module 204, which reduces the required footprint enough to match the footprint of the HV base module 202.

Figure 7:
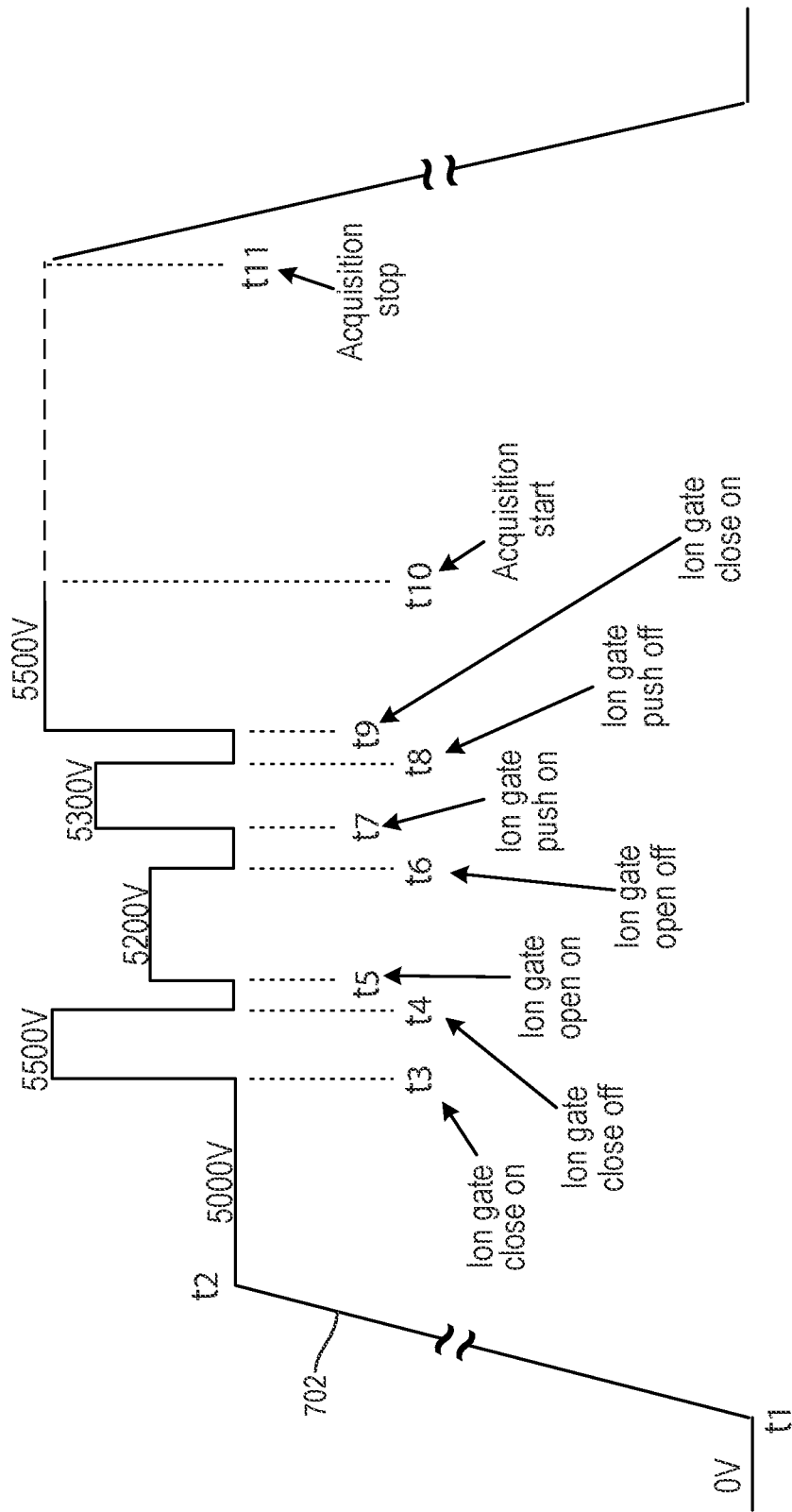
FIG. 7 illustrates an example embodiment of a timing waveform for the voltage the HV deck module applies to the ion gate grid during one polarity of the drift tube voltage.

FIG. 7 illustrates an example embodiment of a timing waveform for the voltage 702 the HV deck module 204 applies to the ion gate grid 103 during one polarity of the drift tube voltage. It should be understood that the voltage values set forth for this example embodiment are for descriptive purposes, and are not intended to be limiting. Other voltage values may alternatively be used.

At time t1, the ion gate grid voltage 702 transitions from zero volts to 5,000 volts, reaching 5,000 volts at time t2. At time t3, the ion gate close state is set to "on," and at time t4 the ion gate close state is set to "off." During the time between t3 and t4 the ion gate grid 103 is at a substantially higher voltage 5,500V) than the ionization region 102, and so blocks ions in the ionization region from proceeding through the gating field region and to the drift tube grid 104. That is, from t3 to t4 the ion gate is closed and prevents ions from passing to the drift tube. At t5 the ion gate open state is set to "on," and at time to the ion gate open state is set to "off," so that in the interval between t5 and t6 the ion gate grid 103 is at a lower voltage (5,200V) than the ionization region 102, and so presents no barrier to ions in the ionization region, thereby allowing ions to drift toward the drift tube grid 104. That is, the ion gate is open and allows ions to pass to the drift tube from time t5 to t6. At time t7, the ion gate push state is set to "on," and at time t8 the ion gate push state is set to "off." During the time between t7 and t8, the ion gate grid 103 is at a voltage that is increased from that of the "on" state voltage (i.e., 5,300V in contrast to 5,200V), which serves to drive ions that are between the ion gate grid 103 and the drift tube grid 104 into the drift tube. At t9 the ion close state is set to "on" as described above, which prevents any further ions from entering the drift tube. At t10 acquisition starts, at t11 acquisition stops, and the ion gate grid voltage 702 falls towards zero volts to begin the above sequence of events at the opposite polarity.

While example embodiments have been particularly shown and described, it will be understood by those skilled in the art that various changes in form and details may be made therein without departing from the scope of the embodiments encompassed by the appended claims.

What is claimed is:

1. An ion mobility detector system, comprising:
an ion mobility detector hardware subsystem comprising a drift tube, a drift tube grid, and an ion gate grid; and
a drift tube voltage driving subsystem comprising:
   a high voltage (HV) base module having a first power supply configured to generate a first high-voltage output and a second power supply configured to generate second high-voltage output;
   an interconnect module configured to electrically and physically couple the HV base module to a HV deck module, the interconnect module comprising a first switch assembly to selectively couple the first high-voltage output to a node to produce a node voltage, and a second switch assembly to selectively couple the second high-voltage output to the node; and
   the HV deck module configured (i) to receive the node voltage, (ii) to generate a grid voltage that floats on the node voltage, and (iii) to convey the node voltage to the drift tube grid and the grid voltage to the ion gate grid of the ion mobility detector hardware subsystem.

2. The ion mobility detector system of claim 1, wherein the node voltage is a cyclic voltage, the cyclic voltage having (a) a first transition interval, (b) a first acquisition interval, (c) a second transition interval, and (d) a second acquisition interval, and wherein each one of the first power supply and the second power supply is regulated in a closed loop by a proportional-integral-derivative (PID) controller during the first and second transition intervals, and is unregulated in an open loop and is locked at a fixed voltage during the first and second acquisition intervals.

3. The ion mobility detector system of claim 1, further including a sequence controller configured to generate at least one synchronization timing pulse, wherein at least the first power supply, the second power supply, the first switch assembly, the second switch assembly, and the HV deck module are synchronized based on the synchronization timing pulse.

4. The ion mobility detector system of claim 1, wherein each of the first and second power supplies comprises:
a digital PID controller configured to produce a pulse-width modulated (PWM) waveform based on feedback from the respective output of the respective power supply;
a switching inverter configured to generate a high voltage signal based on the PWM signal; and
multistage filter configured to attenuate switching noise on the high voltage signal.

5. The ion mobility detector system of claim 1, wherein the first switch assembly and the second switch assembly each comprises a photodiode, a light source to selectively illuminate the photodiode, and a shielding block configured to house the photodiode and light source and block external light therefrom.

6. The ion mobility detector system of claim 5, wherein the first switch assembly and the second switch assembly are arranged between the HV base module and the HV deck module as spacers to provide physical separation therebetween.

7. The ion mobility detector system of claim 5, wherein the photodiode of the first switch assembly and the photodiode of the second switch assembly are each selectively illuminated to control a transition rate of the first high-voltage output and a transition rate of the second high-voltage output.

8. The ion mobility detector system of claim 7, wherein selective illumination of the photodiode of the first switch assembly and the photodiode of the second switch assembly is controlled by a digital signal processor (DSP).

9. The ion mobility detector system of claim 8, wherein the HV base module hosts the DSP.

10. The ion mobility detector system of claim 1, wherein the ion mobility detector hardware subsystem further comprises a data acquisition system configured to detect ions that have completed propagation through the drift tube, and wherein sampling events of the data acquisition system are synchronized with a switching frequency associated with the first high-voltage output and the second high-voltage output, such that the sampling events occur at a consistent point in time with respect to a switching waveform associated with the first high-voltage output and the second high-voltage output.

11. A method of driving a drift tube voltage of an ion mobility subsystem, comprising:
generating, by a first power supply, a first polarity voltage;
generating, by a second power supply, a second polarity voltage, each of the first power supply and the second power supply comprising a proportional-integral-derivative (PID) controller;
using a first photodiode-based switch, selectively applying the first polarity voltage to a node;

using a second photodiode-based switch, selectively applying the second polarity voltage to the node; and electrically coupling the node to the drift tube.

12. The method of claim 11, further comprising applying the first and second polarity voltages to the node to produce a cyclic voltage at the node characterized by (a) a first transition interval, (b) a first acquisition interval, (c) a second transition interval, and (d) a second acquisition interval.

13. The method of claim 12, further comprising regulating each of the first power supply and the second power supply in a closed loop by the PID controller during the first and second transition intervals, and leaving each of the first power supply and the second power supply in an unregulated, open loop state that is locked at a fixed voltage during the first and second acquisition intervals.

14. The method of claim 11, further comprising controlling the first photodiode-based switch and the second photodiode-based switch to control a transition rate of the first polarity voltage and a transition rate of the second polarity voltage.

15. A method of driving voltage signals to a drift tube and an associated ion gate grid of an ion mobility subsystem, comprising:
applying a cyclic drift tube voltage to the drift tube, the cyclic drift tube voltage having (a) a first transition interval, (b) a first acquisition interval, (c) a second transition interval, and (d) a second acquisition interval; and
applying an ion gate voltage to the ion gate grid during at least the first acquisition interval, the ion gate voltage comprising a sum of the drift tube voltage and a time-varying control voltage.

16. The method of claim 15, further comprising generating the cyclic drift tube voltage as a first interval at an ion gate close voltage, followed by a second interval at an ion gate open voltage, followed by a third interval at an ion gate push voltage, followed by a fourth interval at the ion gate close voltage.

17. The method of claim 16, wherein
(i) the ion gate close voltage is greater than a voltage on a sample ionization region, thereby preventing ions from propagating from the sample ionization region to the drift tube,
(ii) the ion gate open voltage is less than a voltage on a sample ionization region, thereby allowing ions to propagate from the sample ionization region to the drift tube, and
(iii) the ion gate push voltage is greater than the ion gate open voltage and less than the ion gate close voltage, thereby propelling ions in a region between the ion gate grid and the drift tube into the drift tube.

18. The method of claim 16, further comprising inserting an interval of substantially zero volts (i) between the ion gate close voltage and the ion gate open voltage, (ii) between the ion gate open voltage and the ion gate push voltage, and (iv) between the ion gate push voltage and the ion gate close voltage.

19. A drift tube voltage driving subsystem, comprising:
a high voltage base module configured to generate at least one high-voltage output;
a high voltage deck module arranged parallel to and spaced apart from the high voltage base module; and
an interconnect module arranged perpendicular to the high voltage base module and the high voltage deck module, the interconnect module electrically and mechanically coupled to the high voltage base module and to the high voltage deck module, the interconnect module configured to electrically couple the at least one high-voltage output from the high-voltage base module to the high voltage deck, and the high-voltage deck module configured to generate a grid voltage based on the at least one high-voltage output and to convey the grid voltage to the drift tube.

20. The drift tube voltage driving subsystem of claim 19, further comprising at least one spacer assembly to maintain spacing between the high voltage base module from the high voltage deck module.

21. The drift tube voltage driving subsystem of claim 20, wherein the at least one spacer encloses a photodiode-based switch and isolates the photodiode-based switch from external light.

22. An ion mobility detector system, comprising:
an ion mobility detector hardware subsystem comprising a drift tube and one or more control grids;
a voltage driving subsystem configured to drive voltages to the drift tube and the one or more control grids, the voltage driving subsystem comprising a switching power supply having a periodic switching waveform characterized by a switching frequency; and
a data acquisition system configured to detect ions that have completed propagation through the drift tube, and sampling events of the data acquisition system are synchronized with the switching frequency such that the sampling events occur at a consistent time with respect to the switching waveform.

23. An ion mobility detector system of claim 22, further including a pulse generator configured to generate at least one synchronizing timing pulse that (i) establishes timing of the sampling events, and (ii) synchronizes the switching waveform with the timing of the sampling events.

* * * * *